United States Patent [19]

Gilcrest

[11] 4,453,852

[45] Jun. 12, 1984

[54] HUB DISENGAGING APPARATUS FOR COMBINES OR THE LIKE

[76] Inventor: James M. Gilcrest, 1605 S. Main St., Holden, Mo. 64040

[21] Appl. No.: 259,986

[22] Filed: May 4, 1981

[51] Int. Cl.³ .......................... B60B 27/00; F16D 1/06
[52] U.S. Cl. ........................................ 403/1; 180/247;
74/15.69; 192/114 R; 192/96; 192/67 R;
403/359
[58] Field of Search ................... 403/359, 1; 180/247;
74/327, 15.4, 114, 15.86, 15.88, 15.69, 405;
192/114 R, 67 R, 96

[56] References Cited

U.S. PATENT DOCUMENTS

| | | | |
|---|---|---|---|
| 2,422,946 | 6/1947 | Brittain | 74/15.6 |
| 2,600,347 | 6/1952 | Wagner | 74/15.86 |
| 2,854,111 | 9/1958 | Simonsen | 403/1 |
| 3,050,321 | 8/1962 | Howe et al. | 403/1 |
| 4,186,626 | 2/1980 | Chamberland | 74/405 X |

*Primary Examiner*—Andrew V. Kundrat
*Assistant Examiner*—Joseph A. Fischetti
*Attorney, Agent, or Firm*—Schmidt, Johnson, Hovey & Williams

[57] ABSTRACT

An improved mechanism is provided for selectively altering the positioning of an inwardly depressable, outwardly biased, shiftable structure, such as a splined shaft, and for releasably holding such structure in either of an inwardly depressed or an outwardly shifted position thereof. The mechanism is especially adapted for use with powered wheel, hub assemblies, such as commonly employed in combines or other normally self-propelled agricultural implements or the like, in which provision is to be made for disengaging the hub from an associated power shaft to permit towing of the implement at higher speeds than normal for field running thereof. In the mentioned application, the mechanism provided by the invention is utilized in lieu of the bolt mounted, reversible, disengaging plate heretofore conventionally employed in the hub assemblies of such agricultural implements and facilitates manual control over engagement and disengagement between the hub and the associated power shaft without the necessity for unbolting, reversing and remounting a reversible disengagement plate, as has been typically required in prior constructions.

10 Claims, 5 Drawing Figures

U.S. Patent  Jun. 12, 1984  4,453,852
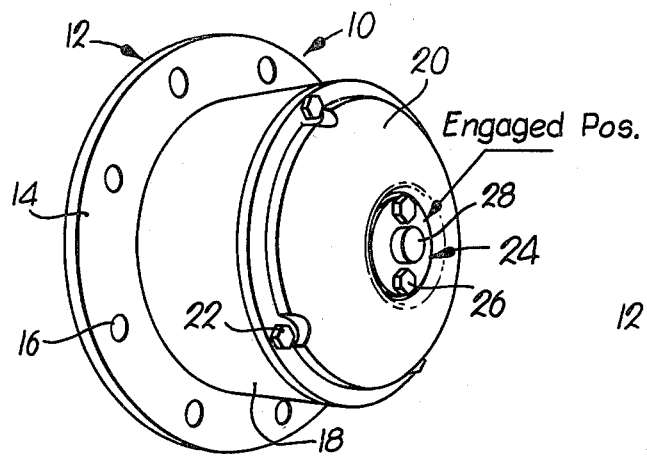
Prior Art  Fig. 1.
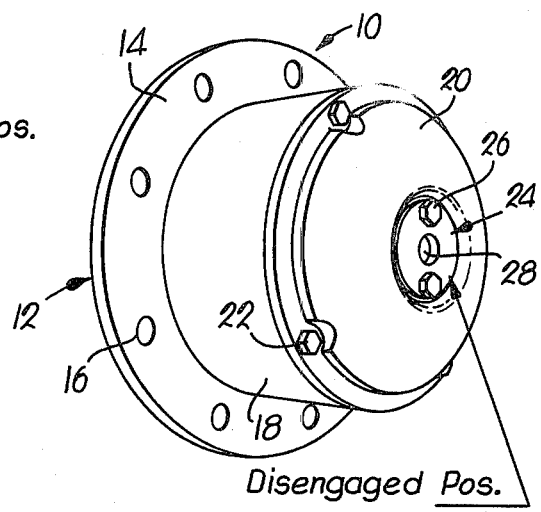
Prior Art  Fig. 2.
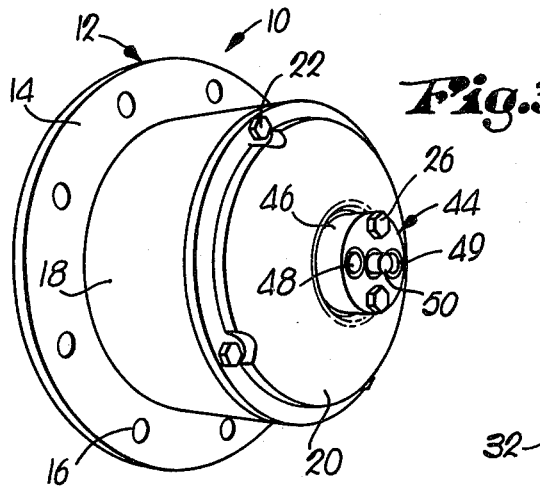
Fig. 3.
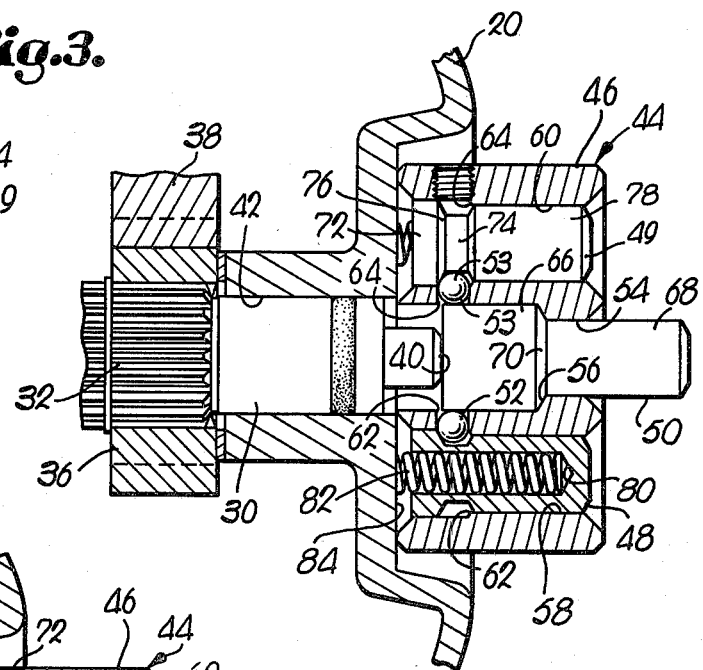
Fig. 4.
Fig. 5.

HUB DISENGAGING APPARATUS FOR COMBINES OR THE LIKE

BACKGROUND OF THE INVENTION

1. Field of the Invention

This invention relates to mechanisms for selectively altering the positioning of an inwardly depressable, outwardly biased, shiftable structure, such as a splined shaft, and for releasably locking such structure in either an inwardly depressed position or an outwardly shifted position thereof. More particularly, the invention provides an improved type of such a mechanism, which may be manually operated to selectively position the associated structure in either the inward or outward position of the latter merely through the application of an inwardly directed pressing force upon the end of an exposed plunger to move the associated structure to its inward position or the application of an inwardly directed force upon the exposed end of one or more control members to permit the associated structure to move to its outward position, with the mentioned plunger, control member(s) and associated structure being releasably interlocked in the conditions into which the same were last actuated and until a subsequent, selective, condition-changing actuation thereof.

The improved mechanism provided by the invention is especially adaptable for use with conventional, powered wheel, hub assemblies of combines or other normally self-propelled agricultural implements or the like, in which application the mechanism of this invention is substituted for the reversible disengaging plate typically heretofore employed in such hub assemblies. The purposes and advantages of utilizing the mechanism of this invention with such hub assemblies, in lieu of the reversible disengaging plate heretofore conventionally employed therewith, include the time saving and increased convenience of being able to selectively control the engaged or disengaged relationship of such a hub assembly to its associated shaft without needing to unbolt, remove, reverse, remount and rebolt a conventional disengaging plate, the adaptability of the improved mechanism to be confidently operated in the field and even in the dark, and the unique way in which such mechanism permits rapid selection between conditions of engagement and disengagement, in conjunction with releasable interlocking of the operative parts in either condition for the sake of reliability.

2. Description of the Prior Art

The most nearly analogous, known prior art is represented by the heretofore common employment of reversibly mounted plates having a projection on one side thereof, as a part of conventional constructions for power wheel, hub assemblies in combines or the like. A typical example of such use of reversible disengaging plates would be the Model 6 power wheel hub assembly marketed by the Warner Gear Division of Borg-Warner Corporation (and analogous products of other concerns). The here significant aspects of such prior devices are illustrated in FIGS. 1 and 2 of the accompanying drawings, and to a lesser extent in portions of FIGS. 4 and 5 of the accompanying drawings, to which reference is now made for explanatory purposes.

As shown in FIGS. 1 and 2, a typical, powered wheel, hub assembly of conventional construction, broadly designated 10, has a hub portion 12 having an annular flange 14 provided with openings 16 for use in bolt mounting a ground engaging wheel (not shown) thereto, and further has a generally cylindrical hollow housing 18 for containing internal gearing as at 36, 38 and other parts (not shown) through which the assembly 10 may be drivingly engaged with a power shaft 30 of the implement. The hub portion 12 will typically be rotatably mounted upon a spindle (not shown), in turn mounted upon the frame of the implement. The hub assemblies 10 further includes a cover 20 bolted to the housing 18 as at 22, and, in the most common prior construction, a reversible disengaging plate broadly designated 24 secured to the outer face of the cover 20 by means of bolts 26. The disengaging plate 24 is conventionally provided on one side thereof with a projection 28, which typically will be hollow or cuplike.

Referring next to the leftmost portion of FIGS. 4 and 5, it will be understood that the assembly 10 is normally associated with an axially shiftable power shaft 30 operably coupled with a hydraulic motor or other source of driving power (not shown) forming a part of the implement. The shaft 30 is provided with splines 32 adapted to operably interengage with grooves 34 in the internal face of a sun gear 36 forming a part of the hub assembly 10 and disposed within the housing 18 of the latter, the sun gear 36 usually having planet gears 38 associated therewith and also disposed within the housing 18. FIG. 4 illustrates the shaft 30 in an outwardly shifted, operative condition thereof in which the splines 32 are received within the grooves 34 of the sun gear 36 to effect a power coupled relationship between the shaft 30 and the hub assembly 10. In FIG. 5, the shaft 30 is depicted in an inwardly depressed condition thereof in which the splines 32 are not engaged with the grooves 34 of the gear 36, which is known as the disengaged position in which no power coupling exists between the shaft 30 and the hub assembly 10. As those familiar with the involved general class of device will be aware, means such as one or more springs (not shown) will be provided as a part of the overall assemblage for yieldably biasing the shaft 30 in an outward direction (i.e., toward the right in the figures of the accompanying drawings), or toward the operative position of the shaft 30 illustrated in FIG. 4, rather than the disengaged position of the shaft 30 illustrated in FIG. 5.

Conventional hub assemblies 10 also typically include a plunger, which may be of somewhat different proportions and construction than the hereinafter described plunger 50 employed in the improved mechanism of this invention, but which is also disposed in axial alignment with the outer end 40 of the shaft 30, is in rotatable engagement with the latter (usually via an intervening thrust washer), and is adapted to be axially shifted along with the shaft 30 either outwardly under the influence of the bias upon the shaft 30 or inwardly in opposition to such bias.

The conventional disengaging plate 24 as shown in FIG. 1 is in the orientation thereof which permits the shaft 30 to shift outwardly into its operative position under the influence of the outward bias thereon, it being understood that the disposition of the hollow projection 28 upon the outer face of the plate 24, when mounted as depicted in FIG. 1, permits the outer end of the mentioned plunger to move into the cup 28 sufficiently for the bias upon the shaft 30 to move it outwardly into its operative position. FIG. 2 illustrates the conventional hub assembly 10 with its disengaging plate 24 mounted in a reversed orientation thereof disposing the projection 28 on the inner side of the plate 24 and, typically, in inwardly extending relationship through an associated central aperature (as at 42 in FIGS. 4 and 5) in the cover 20 aligned with the axes of the shaft 30 and its associated plunger. With the plate 24 mounted on the cover 20 as last described, the projection 28 pushes the mentioned plunger inwardly to shift the shaft 30 inwardly to the disengaged position of the latter.

Such conventional construction hub assembly utilizing a reversible disengaging plate 24 having a projection 28 on one side thereof is effective in permitting an engagement or disengagement of the power coupling between the shaft 30 and the hub assembly 10 to be ultimately accomplished. However, in order to accomplish such result with that structure, for instance changing from the power engaged condition of FIG. 1 to the power disengaged position of FIG. 2, it is necessary to first remove the bolts 26, then remove the diengaging plate 24, then reverse the orientation of the disengaging plate 24, and then reinstall the bolts 26 to mount the plate 24 upon the cover 20 in its reversed orientation. Such operations are obviously time consuming at best and may be quite inconvenient to perform when the implement is in the field, where it typically will be when such a change is to be made. Aside from needing a proper tool to remove and reinstall the bolts 26, there is always the danger of dropping and losing one or more of the parts being handled under field conditions. All of such disadvantages of the conventional construction employing a bolt mounted, reversible disengaging plate 24 are significantly increased when the required operations must be performed in the dark at the end of a long day of field work, as is also typical.

SUMMARY OF THE INVENTION

The improved mechanism provided by this invention overcomes the above noted limitations and disadvantages of conventional, powered wheel, hub assemblies employing reversible disengaging plates. It does so by providing a mechanism that can be permanently bolt mounted and left on the hub assembly, and that can be quickly, conveniently and reliably actuated, even by feel in the dark, to change the relationship of the hub assembly and the associated power shaft between an engaged or coupled condition thereof and a disengaged or uncoupled condition thereof merely through applying a manual pressing force to an appropriate, exposed part or parts of the mechanism that are readily accessible at the outer side thereof. The arrangement of the manually depressable control parts is such that they are readily distinguishable by feel, as well as by sight, and the dispositions they respectively have at any given time reliably indicate whether the shaft and hub assembly are then in an engaged or a disengaged condition. The improved mechanism provided by the invention also incorporates therein means for automatically, releasably holding both the depressable control parts thereof and the condition of engagement or disengagement between the shaft and the hub assembly in the status into which they were last previously actuated, yet the mechanism accomplishes such interlocking in a manner that permits an immediate change to the opposite condition of the apparatus merely upon manual depression of the appropriate control part or parts. Further details of a preferred embodiment of the improved mechanism will be explained in the course of the description thereof which follows hereinafter.

BRIEF DESCRIPTION OF THE DRAWINGS

In the accompanying drawings:

FIG. 1 is a perspective view of a conventional, prior art, powered wheel, hub assembly utilizing a reversible disengaging plate, with the latter illustrated as mounted in its orientation for effecting an engaged relationship between the hub assembly and an associated power shaft;

FIG. 2 is a perspective view of the prior art hub assembly shown in FIG. 1, but illustrating the disengaging plate thereof mounted in the orientation utilized for disengaging the hub assembly from an associated power shaft;

FIG. 3 is a perspective view of a hub assembly generally similar to that shown in FIGS. 1 and 2, but illustrating the employment therewith of the improved control mechanism provided by this invention, in lieu of the reversible disengaging plate typically heretofor utilized;

FIG. 4 is a fragmentary, cross-sectional view taken centrally through a portion of the hub assembly and through the mechanism of this invention, illustrating the positions and relationships of the various parts when the mechanism is in an operative or engaging condition thereof for effecting a power coupling between the hub assembly and an associated shaft; and FIG. 5 is a cross-sectional view similar to FIG. 4, but illustrating the positions and relationships of the parts when the mechanism of the invention is in a disengaging condition for uncoupling the hub assembly from the associated shaft.

DESCRIPTION OF THE PREFERRED EMBODIMENT

Although it should be understood that the improved control mechanism provided by this invention has potential utility and application in a variety of environments in which the positioning of a yieldably biased, shiftable structure is to be controlled, such mechanism is especially adapted for immediate application in combination with powered wheel, hub assemblies, wherein it may be advantageously used in lieu of the conventional reversing plate now typically provided. Accordingly, the invention will be described for illustration with reference to the last mentioned application of the control mechanism for improving powered wheel, hub assemblies.

Referring, therefore, particularly to FIGS. 3, 4 and 5 of the accompanying drawings, it is first noted that the improved hub assembly incorporating the control mechanism of this invention, which is broadly designated 44, will generally include the same parts as hereinbefore described for the conventional hub assembly 10 and its associated power shaft 30, except that the control mechanism 44 is substituted for the reversible disengaging plate 24. Such parts, which are common to either conventional hub assemblies or the improved hub assembly achieved by this invention are identified by the same reference numerals in the accompanying drawings for both.

Broadly, the control mechanism 44 includes a support body 46, a pair of shiftable control members 48 and 49, a shiftable plunger 50 aligned and associated with the outer end 40 of the shaft 30, and a pair of interlocking elements in the form of balls 52 and 53.

The body 46 of the mechanism 44 is drilled to permit essentially permanent mounting thereof upon the cover 20 of the hub assembly, by means of the same or analogous bolts 26 as have heretofore conventionally been employed for mounting a reversible disengaging plate 24 upon the cover 20. In the preferred embodiment, two bolts 26 are illustrated opposite each other to accommodate to the location of cooperating threaded openings (not shown) in the cover plate 20 for an exemplary make and model of hub assembly, although it will be understood that a different number of bolts 26 in a different arrangement could be used to accommodate to the threaded bolt receiving means provided in other makes or models of existing hub assemblies.

In addition to the appropriate drillings (not shown) through the body 46 of the mechanism 44 to accommodate the bolts 26 in selected locations, the body 46 is provided with a central bore 54 extending in an inward-outward direction therethrough in alignment with the aperature 42 of the cover 20 and with the axis of the shaft 30. The bore 54 has an inwardly facing, in-turned shoulder as at 56 for purposes hereinafter noted. The body 46 is also provided with a pair of inwardly-outwardly directed holes 58 and 60 for respectively accommodating the control members 48 and 49. The holes 58 and 60 have their axes laterally offset in opposite directions from the axis of the bore 54 and substantially parallel to the latter. The holes 58 and 60 are also respectively provided with inwardly facing, in-turned shoulders as at 62 and 64 for purposes hereinafter noted. The bore 54 laterally communicates with each of the holes 58 and 60 by means of aperatures or passages 62 and 64, which are disposed intermediate the extremities of both the bore 54 and the holes 58 and 60.

The plunger 50 is dimensioned to accommodate to the size of the body 46 and the dimensions of the bore 56 and, in at least that respect, may differ from the disengaging plunger that would have been employed with a conventional construction of the hub assembly 10 utilizing a reversible disengaging plate 24. In the preferred construction, the plunger 50 includes an inward, cylindrical stretch 66 and an outward cylindrical stretch 68 of lesser diameter than the stretch 66, between which is a zone of transition in the form of an outwardly facing shoulder 70. The plunger 50 is preferably of axial length such as to protrude from the outer face of the body 46 when the plunger is in its normal operating position illustrated in FIG. 4 and to extend inwardly through the aperature 42 of the cover 20 when the plunger 50 is in its disengaging position as illustrated in FIG. 5, it being understood that the plunger 50 is slidably received within the bore 54 for axial movement between those positions under the conditions hereinafter described. The shoulder 56 of the bore 54 serves to limit the range of outward movement of the plunger 50 by engagement with the transition shoulder 70 of the latter when the plunger 50 is in its normal operating position. The longitudinal axis of the plunger 50 is, of course, aligned with the axis of the shaft 30, and the inner (or left-most) extremity of the plunger 50 is adapted to engage the outer end 40 of the shaft 30, either directly as depicted for simplicity of illustration or indirectly through a thrust washer or the like (not shown). In any case, it will be understood that the outwardly directed, yieldable bias upon the shaft 30 normally urges the plunger 50 outwardly by virtue of the mentioned engagement or other equivalent operable coupling between the shaft 30 and the plunger 50, while, on the other hand, an inwardly directed, depressing force applied to the outer extremity of the plunger 50 will be transmitted to the shaft 30 to shift the latter inwardly against the outwardly directed, yieldable bias upon the shaft 30. It will also be understood that the inner engagement or other coupling between the outer end 40 of the shaft 30 and the inner extremity of the plunger 50 should preferably be of nature permitting relative rotation between such parts, so that the plunger 50 will not be rotated by the shaft 30, or vice versa, when the hub assembly is in its disengaged condition.

Although only a single control member 48 or 49 would really be necessary, the preferred construction provides the illustrated pair of control members 48 and 49 juxtaposed in the body 46 on opposite sides of the plunger 50 for increased reliability of operation of the mechanism 44 under field conditions, such as in the dark, when the presence of a pair of such control members 48 and 49 facilitates distinguishing the same even by feel from the similar diameter stretch 68 of the plunger 50. For the same reason, the members 48 and 49 extend outwardly from the outer face of the body 46, when in their holding position illustrated in FIG. 5, than does the plunger 50, when the latter is in its normal position illustrated in FIG. 4. The control members 48 and 49 are substantially identical to each other from the constructional standpoint and as regards their respective relationships to the body 46 and the plunger 50. Each member 48 and 49 includes an inner, generally cylindrical stretch 72, a more outward stretch 74 of lesser diameter than the stretch 72, a zone of transition in the form of an outwardly facing shoulder 76 between the stretches 72 and 74, and, in the preferred construction, an outer-most stretch 78 of diameter intermediately between those of the stretches 72 and 74. As will be apparent from the drawings, the holes 58 and 60 are cooperatively configured to receive the members 48 and 49 in inwardly-outwardly shiftable disposition therein, and it will be understood that the rearwardly facing shoulders 62 and 64 of the holes 58 and 60 cooperate with the outwardly facing shoulders 76 upon the members 48 and 49 to limit the outward travel of the latter. Each of the members 48 and 49 is provided with a cavity 80 extending therein from the inner extremity thereof for receiving the outer portion of a spring 82 that engages the outer surface 84 of the cover 20. The springs 82 serve to maintain the control members 48 and 49 in a yieldably outwardly biased condition.

The balls 52 and 53 within the passages 62 and 64 respectively serve as a shiftable means for releasably interlocking the plunger 50 and the control members 48 and 49 in either the normal operating condition illustrated in FIG. 4 or the disengaging condition illustrated in FIG. 5, despite the continuing outward bias being applied both to the plunger 50 via the shaft 30 and to the control members 48 and 49 from the springs 82. As will be clear from the drawings, the balls 52 and 53 are of dimensions relative to the sizes of the passages 62 and 64 such that the balls 52 and 53 may readily shift in either direction along their respective passages 62 and 64, between alternate positions in which they will either extend laterally into the bore 54 but not into the holes 58 and 60 or will extend laterally into the holes 58 and 60 but not into the bore 54. The disposition of the passages 62 and 64, in relation to the location of the transition shoulder 70 of the plunger 50 and the transition shoulders 76 of the control members 48 and 49 is such that, when the mechanism 44 is in its normal operating condition, the cylindrical surface of the inner stretch 66 of the plunger 50 will hold the balls 52 and 53 in positions for engaging the shoulders 76 of the control members 48 and 49 to retain the latter in their releasing position as illustrated in FIG. 4 against the biasing force of the springs 82. Similarly, when the plunger 50 is moved into its disengaging position as illustrated in FIG. 5, the cylindrical surfaces of the inner stretches 72 of the control members 48 and 49 hold the balls 52 and 53 in retaining engagement with the shoulder 70 of the plunger 50.

Nevertheless, despite such desired interlocking of the plunger 50 and the control members 48 and 49 in the respective relationships thereof illustrated in FIG. 4 for the normal operating condition of the mechanism 44 and in FIG. 5 for the disengaging condition of the mechanism 44, it will be perceived that the condition of the mechanism 44 may be altered from either to the other of the mentioned conditions merely by applying inwardly directed force either to the outer end of the plunger 50 or the outer ends of the control members 48 and 49, as the case may be, and, in either of such cases, the involved movement of the part or parts receiving the inwardly directed external force will permit and urge the balls 52 and 53 to shift into the alternate positions thereof for effecting the releasable interlocking of the mechanism 44 in the desired condition.

The practical operation of the mechanism 44 may, therefore, be summarized as follows, asssuming for illustrative purposes that the mechanism 44 is associated with a powered wheel, hub assembly of a combine or other piece of agricultural or industrial equipment. Further assume, first, that the piece of equipment has been running in a self-propelled manner, with the mechanism 44 in its normal operating condition as illustrated in FIG. 4, in which the outwardly displaced positioning of the plunger 50 has permitted the outwardly biased shaft 30 to move to its outward position meshing the splines 32 with the grooves 34 of the gear 36 to effect an operable coupling between the shaft 30 and a ground engaging wheel mounted upon the hub portion 14 of the driven wheel, hub assembly. If it is desired to disengage the operative coupling of the shaft 30 from the hub assembly, in order that the piece of equipment may then safely be towed to another field or location, typically at increased speed as compared wih normal field operation, the piece of equipment is stopped, driving power to the shaft 30 is preferably cut off, and the operator applies manual, inwardly directed force to the outer end of the plunger 50 to move the latter from the position illustrated in FIG. 4 to the position illustrated in FIG. 5. As the plunger 50 is thus being depressed into its inward position, its engagement or equivalent operable coupling with the front end 40 of the shaft 30 also forces the shaft 30 to move inwardly until the splines 32 have been disengaged from and are clear of the grooves 34, thereby interrupting any driving coupling in either direction between the shaft 30 and the rotatable hub assembly. As the plunger 50 moves into its inwardly depressed, disengaging position as illustrated in FIG. 5, the transition zone 70 of the plunger 50 will move inwardly of the ends of the passages 62 and 64 communicating with the bore 54, thereby permitting the balls 52 and 53 to shift into the bore 54 for engaging the shoulder 70 of the plunger 50 to hold the latter in its disengaging position. As the balls 52 and 53 shift along their passages 62 and 64 into the bore 54, they are assisted in that movement by the inclined surface of the shoulders 76 on the control members 48 and 49, which are being urged outwardly by the springs 82, and, as soon as the balls 52 and 53 have shifted sufficiently into the bore 54 and out of the holes 58 and 60, the springs 82 will move the control members 48 and 49 outwardly into their holding positions illustrated in FIG. 5, in which the cylindrical surface of the inner stretches 72 thereof serve to retain the balls 52 and 53 in the described position for holding the plunger 50 in its disengaging position until the condition of the mechanism 44 is altered by further manual actuation thereof.

Next, assume that the piece of equipment has reached a new location with the mechanism 44 in its disengaged condition as illustrated in FIG. 5, and that it is then desired to restore the drive coupling between the shaft 30 and the associated hub assembly. In such case, with the piece of equipment preferably in halted condition and the shaft 30 not being drivingly rotated, the operator needs merely to concurrently apply inwardly directed, manual depressing forces to the outer ends of the control members 48 and 49, which it will be observed from FIG. 5 are free to move to their releasing positions illustrated in FIG. 4 under the influence of such forces. As the control members 48 and 49 move into their releasing conditions illustrated in FIG. 4, the shoulders 76 of the members 48 and 49 will be disposed inwardly of the extremities of the passages 62 and 64 communicating with the holes 58 and 60, and the lesser diameter or cross-sectional dimension of the more outward stretches 74 of the members 48 and 49 will permit the balls 52 and 53 to be shifted away from the bore 54 and into the holes 58 and 60. The inclined shoulder 70 on the plunger 50, together with the outward bias upon the plunger 50 derived from the shaft 30, urges the balls 52 and 53 out of the bore 54 and into the positions illustrated in FIG. 4 in which they extend into the holes 58 and 60. As soon as the balls 52 and 53 thus clear the bore 54, the plunger 50 will move outwardly to its normal operating position illustrated in FIG. 4 under the influence of the outward bias derived from the shaft 30. As will be clear from FIG. 4, with the plunger 50 thus shifted into its normal operating position, the cylindrical surface of the inner stretch 66 thereof will then maintain the balls 52 and 53 in engagement with the shoulders 76 of the control members 48 and 49 to retain the latter in their releasing positions until the next manually actuated change of condition of the mechanism 44.

Those skilled in the art will appreciate that various minor modifications in details of construction could be made from the preferred embodiment of the invention herein disclosed for illustrative purposes, without departing from the gist and essence of the invention. Accordingly, it is to be understood that the invention should be regarded as being of the scope defined by the claims which follow, including mechanically equivalent constructions.

I claim:

1. A mechanism for selectively controlling the positioning of a shiftable structure under the influence of an outward yieldable bias in either an inwardly shifted position thereof or an outwardly shifted position thereof, including:

support means disposed in a fixed location relative to said positions of said structure;

first shiftable means carried by said support means and operably associated with said structure for movement of said first shiftable means between a normal outer position in which said structure is permitted to shift to said outwardly shifted position thereof under the influence of said bias and an actuated inner position in which said first shiftable means displaces said structure to said inwardly shifted position thereof against the force of said bias;

second shiftable means carried by said support means for movement between a holding position thereof and a releasing position thereof;

means for yieldably biasing said second shiftable means toward said holding position thereof; and shiftable interlocking means for operably coupling said first and second shiftable means to maintain said first shiftable means in said actuated condition thereof when said second shiftable means is in said holding position thereof, to release said first shiftable means for movement into said normal position thereof when said second shiftable means is moved to said releasing position thereof, to maintain said second shiftable means in said releasing position therof when said first shiftable means is in said normal position thereof, and to release said second shiftable means for movement into said holding position thereof when said first shiftable means is moved to said actuated position thereof.

2. A mechanism as set forth in claim 1, wherein:

there are a plurality of said second shiftable means and said biasing means therefor, each configured and arranged as recited for said first-mentioned second shiftable means and its associated biasing means, all of said plurality of second shiftable means being operable as a group, as recited for said first-mentioned second shiftable means, whereby inadvertent possible actuation of less than all of said second shiftable means into said releasing position thereof will not result in shifting of said structure to its outwardly shifted position.

3. A mechanism as set forth in claim 1, wherein:

said first and second shiftable means are reciprocable along substantially parallel paths.

4. A mechanism as set forth in claim 3, wherein:

said first and second shiftable means are slidably mounted respectively in a bore and a laterally adjacent hole provided for that purpose in said support means.

5. A mechanism as set forth in claim 4, wherein:

there is a passage within said support means oppositely communicating laterally with said bore and said hole intermediate the extremities thereof, said interlocking means comprises ball means shiftably received in said passage and configured to alternately extend into one or the other of said bore and said hole, and each of said first and second shiftable means respectively is provided with adjacent stretches of different cross-sections to present a zone of transition thereon engageable with said ball means.

6. For use in combination with a rotatable, powered wheel, hub assembly of a normally self-propelled agricultural implement or the like, wherein said hub assembly is of the general type:

adapted to be selectively engaged in or disengaged from coupled relationship with a rotatable and axially shiftable, power shaft of said implement that is yieldably biased in an axially outward direction, adapted to be rotatably carried by said implement and having a hub portion adapted to have a ground contacting wheel mounted thereon, including an outer cover secured to said hub portion and provided with an aperture aligned with the axis of said shaft and disposed outwardly from the outer end of said shaft, and heretofore typically provided with a disengaging plunger aligned with the axis of said shaft and said aperature and operably coupled at the inner extremity thereof with the outer end of said shaft, and with a reversible disengaging plate having a projection on one side thereof and adapted to be removably bolted upon said cover in either a normal orientation disposing said projection outwardly to permit said plunger to move outwardly and said shaft to shift axially outwardly into coupled relationship with said hub assembly or a reversed disengaging orientation disposing said projection inwardly to displace said plunger inwardly and shift said shaft axially inwardly and out of coupled relationship with said hub assembly, improved disengaging control means, for employment in lieu of said bolt mounted, reversible disengaging plate, including:

a body provided with a bore therethrough and at least one elongate hole therein with the axes of the latter and said bore being substantially parallel and laterally offset from each other;

means for mounting said body on said cover with said bore in communication with said aperture of said cover and in axial alignment with said shaft, and with each said hole having an outwardly facing end;

a disengaging plunger reciprocably mounted in said bore, having its inner extremity operably coupled with the outer end of said shaft, provided with inner and outer stretches of which said outer stretch is of lesser cross-section than said inner stretch and has a zone of transition with the latter, and movable between an outwardly displaced normal operating position, toward which it is urged by the yieldable bias upon said shaft and in which the disposition of the inner extremity of said plunger permits said shaft to move outwardly into coupled relationship with said hub assembly under the influence of said bias upon said shaft and the outer extremity of said plunger is exposed for application of an inwardly directed disengaging force thereto, and an inwardly displaced disengagement actuated position, toward which said plunger may be moved by said disengaging force against said bias upon said shaft and in which said inner extremity of said plunger displaces said shaft inwardly and out of coupled relationship with said hub assembly;

a control member reciprocably mounted in each said hole respectively, provided with inner and more outward stretches of which said more outward stretch is of smaller cross-section than said inner stretch and has a zone of transition with the latter, and movable between an outwardly displaced holding position in which its outer extremity is exposed for application of an inwardly directed control force thereto and an inwardly displaced releasing position;

means for yieldably biasing each said control member respectively toward its said holding position;

a lateral passage communicating between said bore and each said hole respectively at a location within said bore juxtaposed with said outer stretch of said plunger adjacent said zone of transition thereof with said inner stretch of said plunger when the latter is in said actuated position thereof, and at a location within each said hole juxtaposed with said more outward stretch of said control member adjacent said zone of transition thereof with said inner stretch of said member when the latter is in said releasing position thereof; and a shiftable interlocking element for each said passage respectively movable between a member holding position extending into said hole and plunger holding position extending into said bore, each said interlocking element being oppositely engaged with said inner stretch of said plunger and with said more outward stretch of the associated member to hold the latter in its said releasing position when it has been shifted to said releasing position and said plunger moves into its said normal operating position under the influence of said bias upon said shaft, and each said interlocking element being oppositely engaged with said inner stretch of the associated member and with said outer stretch of said plunger to hold the latter in its said disengagement actuated position when it has been shifted to said actuated position and said member moves into its said holding position under the influence of said biasing means associated therewith.

7. Apparatus as set forth in claim 6, wherein:
there are a pair of said control members which must be concurrently shifted into said releasing position thereof to permit movement of said plunger from said normal operating position to said disengagement actuated position thereof.

8. Apparatus as set forth in claim 6, wherein:
said bore has an inwardly facing shoulder for engagement by said transition zone of said plunger to limit outward movement of the latter, and
each said hole has an inwardly facing shoulder for engagement by said transition zone of the associated said member to limit outward movement of the latter.

9. Apparatus as set forth in claim 6, wherein:
each said interlocking element comprises a ball movable along said passage.

10. Apparatus as set forth in claim 6, wherein:
said mounting means comprise bolts for securing said body upon said cover in substantially the same location upon the latter as would have been occupied by a conventional disengaging plate to be reversibly mounted thereon.

* * * * *